United States Patent [19]
Dujon et al.

[11] Patent Number: 5,327,514
[45] Date of Patent: Jul. 5, 1994

[54] VISUAL IMAGE TRANSMISSION BY FIBRE OPTIC CABLE

[75] Inventors: Gregory F. Dujon, Liverpool; Arthur B. Parker, Wirral; Andrew J. Thomas, Hants, all of Great Britain

[73] Assignee: The Secretary of State for Defence in Her Britannic Majesty's Government of the United Kingdom of Great Britain and Northen Ireland, Great Britain

[21] Appl. No.: 906,888

[22] Filed: Jul. 6, 1992

Related U.S. Application Data

[63] Continuation of PCT Ser. PCT/GB90/01,683, Nov. 2, 1990, abandoned.

[30] Foreign Application Priority Data

Nov. 3, 1989 [GB] United Kingdom ............... 8924793

[51] Int. Cl.$^5$ ............................................. G02B 6/04
[52] U.S. Cl. ................................. 385/115; 385/116; 385/119
[58] Field of Search .............. 385/116, 117, 119, 120, 385/115

[56] References Cited

U.S. PATENT DOCUMENTS

| | | | |
|---|---|---|---|
| 4,570,063 | 2/1986 | De Bie et al. | 250/227.26 |
| 4,760,421 | 7/1988 | Margoli | 355/1 |
| 4,762,391 | 8/1988 | Margolin | 385/116 |
| 4,812,646 | 3/1989 | Waszkiewicz | 385/116 |
| 4,815,816 | 3/1989 | Schneider | 385/116 |
| 5,011,261 | 4/1991 | Gordon | 385/116 |
| 5,016,974 | 5/1991 | Lee | 385/116 |
| 5,061,036 | 10/1991 | Gordon | 385/116 |

FOREIGN PATENT DOCUMENTS

| | | | |
|---|---|---|---|
| 2082012A | 2/1982 | United Kingdom | H04N 7/16 |
| 2092859A | 8/1982 | United Kingdom | H04N 7/18 |
| 2128839A | 5/1984 | United Kingdom | H04N 7/18 |

OTHER PUBLICATIONS

Patent Abstracts of Japan, vol. 10, No. 80, (P-441)(2137) Mar. 29, 1986, & JP, A, 60217306 (Mitsubishi Jukogyo K.K.) Oct. 30, 1985.

*Primary Examiner*—Frank Gonzalez
*Attorney, Agent, or Firm*—Nixon & Vanderhye

[57] ABSTRACT

A method of calibrating an incoherent optical fibre bundle to be used for image transmission, by determining the relative input to output position of each fibre in the bundle and processing the light output of the bundle accordingly. The calibration technique comprises, defining an address array capable of defining for the optical bundle the position of the ends of individual optical fibres in the bundle; transmitting a series of test images into one end of the optical fibre bundle, each test image illuminating a substantial proportion of the pixels and the combination of which selectively illuminate each pixel of the address array; analysing the output of the fibre bundle with reference to the transmitted images to produce a reference table of input to output for the fibres; and using the reference table to deconvolve an image transmitted along the fibre bundle. Calibrated incoherent optical fibres are of particular use for examining nuclear reactors, chemical vats and other harsh environments.

41 Claims, 5 Drawing Sheets

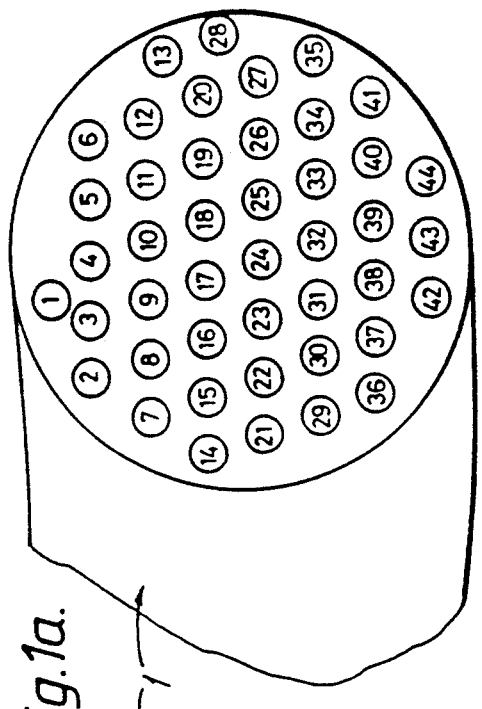
Fig.1a.
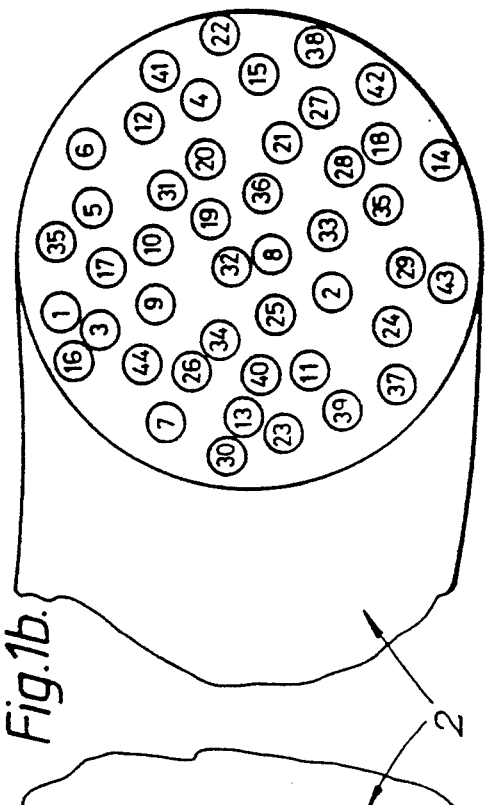
Fig.1b.
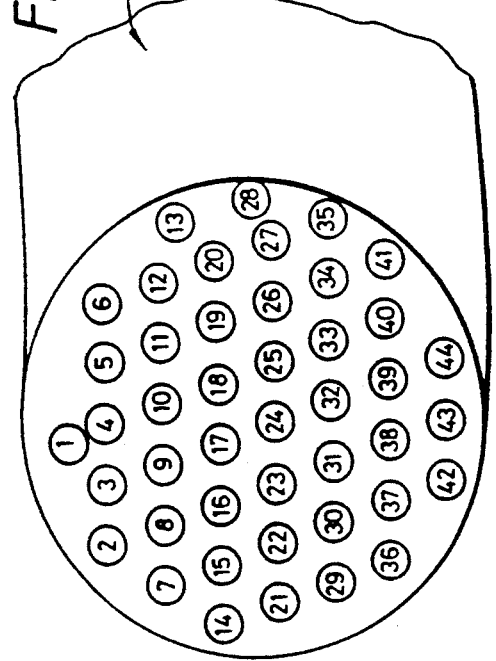
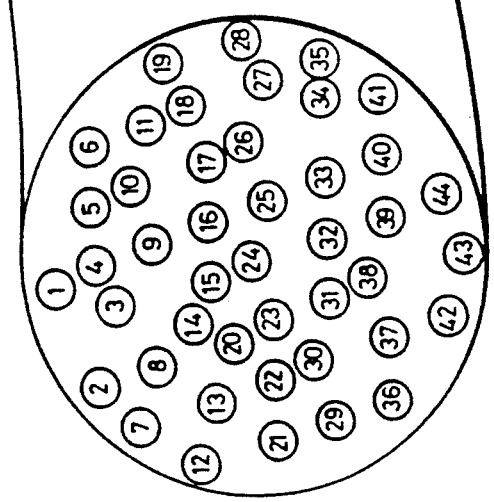

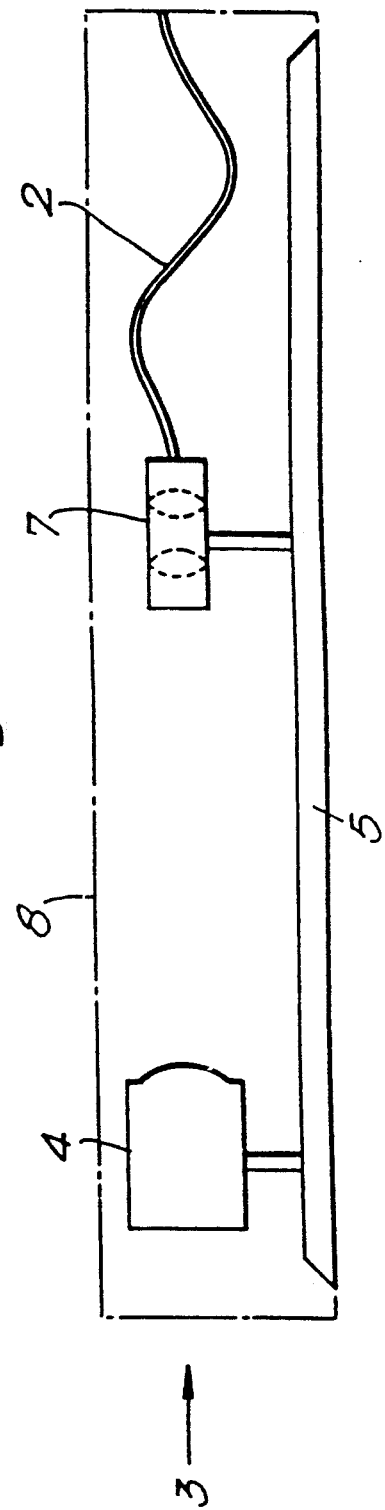
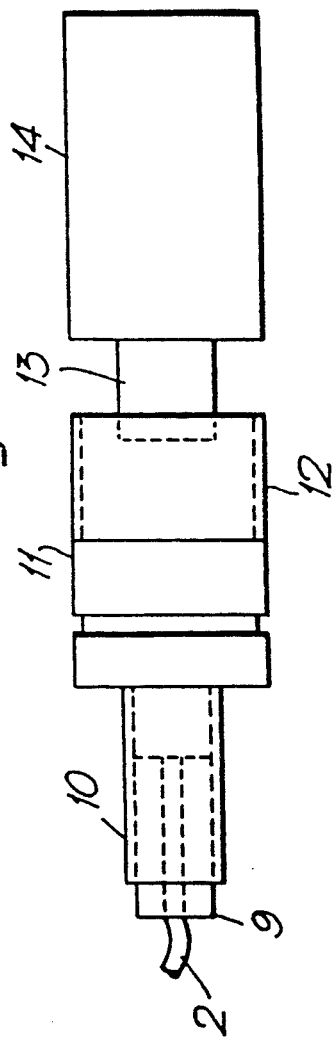

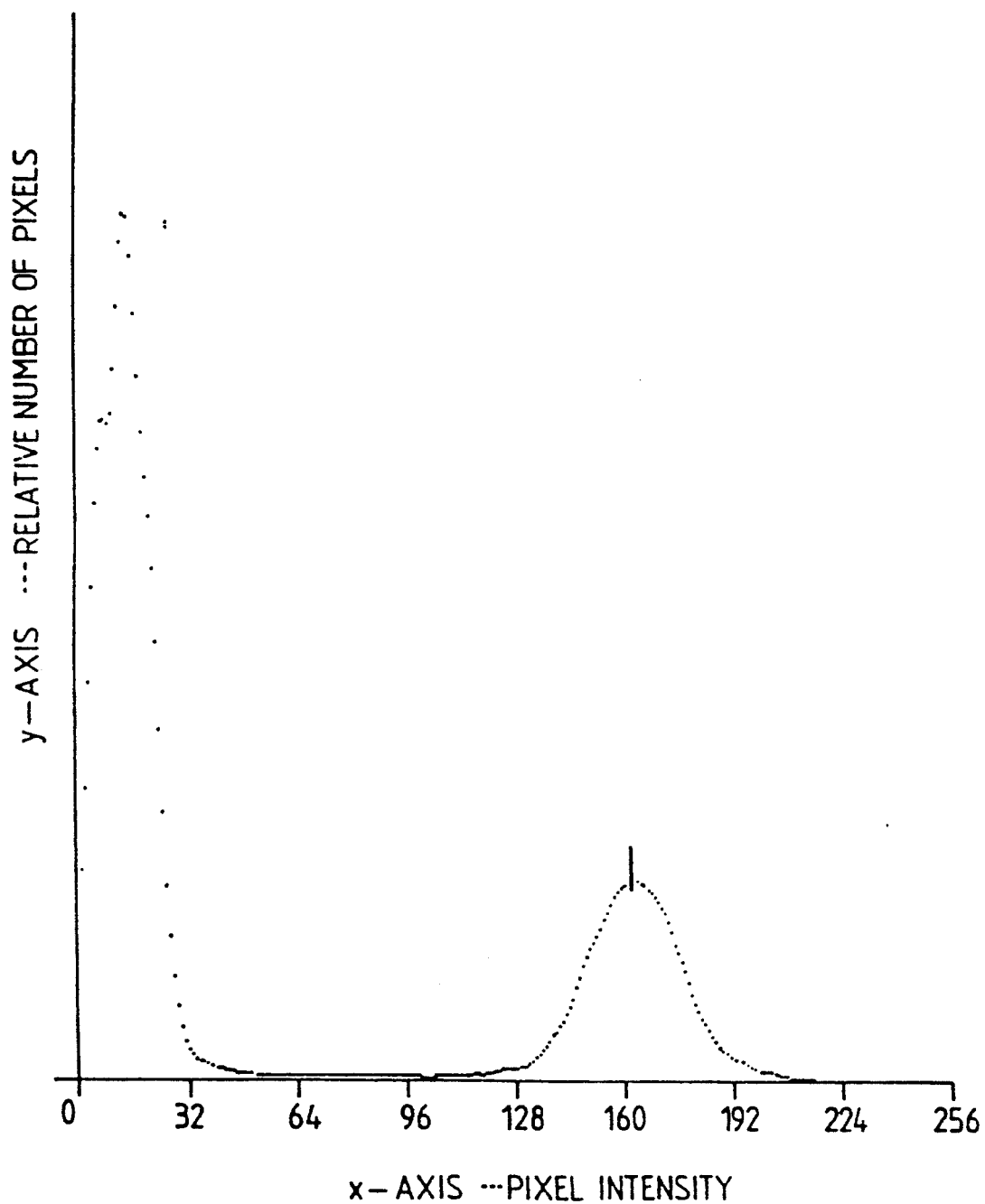

VISUAL IMAGE TRANSMISSION BY FIBRE OPTIC CABLE

This is a continuation of PCT application No. PCT/GB90/01683, filed Nov. 2, 1990, now abandoned.

BACKGROUND OF THE INVENTION

1. Field of the Invention

The invention relates to the transmission of visual images along optical fibre bundles.

Two types of optical fibre bundle are used: coherent fibre bundles and incoherent fibre bundles.

2. Discussion of Prior Art

Coherent fibre bundles are assembled in such a way that the spatial relationships between fibres are maintained, i.e. there is an exact positional correspondence between the two ends of each fibre in the bundle. Any image transmitted along the fibre therefore remains in its original orientation and is not corrupted.

Incoherent fibres are primarily used as flexible light sources and as such have no requirement for maintaining the orientation of the images transmitted along the fibre. Such light guides are manufactured by assembling the fibres at one end and clamping them, then stretching them out and clamping them at the other end. This process does not require the high levels of accuracy necessary in the manufacture of coherent optical fibres and therefore results in much lower costs. Light guides can also be made in very long lengths (tens of meters) whereas it is difficult to manufacture coherent fibres in such lengths.

It is consequently desirable to be able to calibrate incoherent optical fibre bundles so that they can be used as coherent bundles for the transmission of images.

In this respect various techniques have been proposed. UK Patent Application No. 2082012 concerns a system for a non-coherent fibre-optic bundle image decoder wherein the information on the relative input to output position of each optical fibre is stored, and a computer uses this information to reconstruct an image which has become jumbled in transmission along the fibres. However the relative input to output position for each fibre is determined by interrogating each fibre input with a spot of light, identifying its output position and storing the information. As the number of fibres necessary to produce a reasonably detailed output image has to be large, typically several tens of thousands, this approach is very time consuming. UK Patent Applications Nos. 2092859 and 2124054 also discuss devices using calibrated incoherent optical fibre bundles but as with UK 2082012 calibration is achieved by interrogating single fibres so that determining and storing the fibres positional information is again very time consuming. UK Patent Application No. 2128839 concerns an image display apparatus which uses incoherent optical fibre bundles. In this case the relevant positional information about the fibres is determined by illuminating successive single fibre wide columns of one end of the fibre bundle and noting the output positions of the illumination. Subsequently, and at the same end as the columns were illuminated, perpendicular illumination of successive rows of the fibre bundle, again one fibre wide, is undertaken and the output positional information noted. The combination of the information provided allows the relative input to output position for each fibre in the bundle to be determined. This technique is still very time consuming because a large number of measurements still need to be made for a fibre bundle suitable for image transmission.

SUMMARY OF THE INVENTION

The object of the invention is to provide a means of using incoherent fibre bundles as pseudo-coherent fibre bundles for the transmission of visual images where the calibration time is improved compared to previous techniques.

The invention provides a method of calibrating incoherent optical fibre bundles for use as pseudo-coherent optical fibre bundles for the transmission of visual images, comprising the steps of:

defining an address array capable of defining for the optical bundle the position of individual pixels corresponding to the position of the ends of individual optical fibres in the bundle;

transmitting a series of test images into the optical fibre bundle, each test image illuminating a substantial proportion of the pixels and the combination of which selectively illuminate each pixel of the address array;

analysing the output of the fibre bundle with reference to the transmitted images to produce a reference table of input to output for the fibres;

the reference table then being able to be used to deconvolve an image produced at the output end of the fibre bundle.

The method of the present invention can provide under optimal conditions a significant reduction in the time taken in calibrating incoherent optical fibres and can achieve calibration of a 256 by 256 fibre bundle in about 5 minutes where it would previously have taken in excess of 15 hours. Preferably the address array has dimensions capable of defining the position of individual pixels corresponding to the position of each optical fibre in the bundle.

As the aim of the invention is to calibrate an incoherent optical fibre bundle for image transmission there is a lower limit of fibres below which the image resolution is unsuitable. This lower limit depends on the resolution required for a particular application, however, it is unlikely that a fibre bundle for image transmission will possess less than about 2000 fibres.

The use of the term substantially herein refers to each test image illuminating between a quarter and three quarters of the fibres in a bundle.

Because of difficulties in arranging for each pixel address to be specific to a particular fibre it may be necessary for the address array dimensions to be greater than those which cater for one pixel mapping onto one fibre. Where a fibre bundle is non square, e.g. circular, but the address array dimensions are square then, the address array will include pixels with no corresponding fibre.

Preferably each fibre position in a bundle of fibres can be mapped by a unique address. The dimensions of the address array are preferably determined by binary code. For a fibre bundle having at it's end an arrangement of 256 fibres in the X plane and 256 fibres in the Y plane the location of an individual fibre will require a 16 bit address with each pixel preferably mapping onto one fibre only. Of this address 8 bits identify a fibre location in the X plane whilst the other 8 bits identify the location of the fibre in the Y plane allowing determination of the fibres position in both planes (2-dimensions). The total number of fibres or pixel addresses given by this technique for the above arrangement is $2^{2n}$ where n is the number of bits in the X or Y address array. Preferably each of the test images transmitted illuminate half the fibres of the bundle. This presents the most efficient way to interrogate and determine the input to output position of the fibres. The total number of bits in the X and Y arrays making up the address array corresponds to the number of test images needed to locate the position of each fibre in the bundle when each test image illuminates half of the fibres. Therefore for a fibre bundle having 256 by 256 fibres in square formation with an address having 16 bits to map each pixel 16 test screens are required. Whilst the calibration technique is not in theory limited by the size of fibre bundle there are practical reasons such as software manipulation of the address values for not having too large an address. It has been found that an arrangement of 256 fibres square corresponding to 256 pixels by 256 lines will produce picture quality good enough for most applications.

The test images must be accurately positioned at the input end of the fibre bundle and must be sufficiently bright to produce a detectable output at the far end of the fibre bundle. Incorrect positioning of the test images will result in failure to illuminate certain fibres which should be illuminated and vice versa with the consequence that proper calibration is not achieved. Preferably the test image is provided by screens displayed on a monitor of appropriate resolution. Preferably the test images are orthogonal to the end of the fibre bundle.

Preferably the test images have setting areas which provide an image of maximum brightness (white) whilst the rest of the screen is set to black. This gives good contrast between the different areas which helps in achieving accurate calibration of the fibres.

Preferably the areas which are white or black are determined by the address bits in an array. Various types of test images can be projected onto the end of the optical fibre bundle to selectively illuminate the optical fibres but preferably the illumination comprises vertical or horizontal stripes. Other types of test image are possible for example a series of illuminated rings which in combination with illuminated wedge portions arranged in relation to a central point allow determination of pixel position on a circumference at any position from the central point. This is a polar type co-ordinate system. Alternatively, fibre interrogation could be undertaken with test images which are a series of chequer patterns and where preferably each image illuminates half the fibre bundle.

Preferably the particular test image produced depends on the binary address code. Preferably each test image for either the X plane or the Y plane has all the bits except one set to 0 (not illuminated) and the other to 1 (illuminated). This produces the desired illumination of half of the fibres for each test image and each test image is produced with a different bit set to 1 so that for each complete calibration each bit of the address array is set to 1 once. The information supplied by all the test images allows determination of the relative input to output position for all fibres falling within the scope of the address array. By suitable processing (addition and/or subtraction) of the received images the output image corresponding to illumination by a single input pixel can be obtained. Consequently the relative input to output position of each fibre can be determined.

The fibre bundle should preferably be positioned near the light output of the test images to minimise spreading of light, which could cause illumination of fibres when not required. Preferably a lens system is used to focus one light output of the test images onto the end of the bundle. Preferably the monitor screen is small to enable the fibre bundle to be close to the monitor and allow the lens system to be simple. Because of difficulties in achieving this, focussing is preferably undertaken with a coherent fibre bundle and a test image until half the bundle is illuminated, the coherent bundle then replaced with an incoherent bundle.

Preferably a camera is used as the sensor to detect the output of the fibre in the bundle. Preferably a solid state charge coupled device (CCD) camera is used. Alternatively a video camera could be used but these tend to be larger and less accurate.

Preferably a sliding tube arrangement is provided to enable the distance from the sensor to be varied and thus the magnification of the output image from the fibre bundle end to be varied. Preferably the end of the fibre bundle is magnified so that the image received by the camera is as large as desirable. Where a CCD camera is used the image is ideally magnified to the size of the CCD sensor to give maximum image resolution. This can be achieved by reversing the normal lens mounting on the camera so that the camera sensor is at the object end of the lens.

Advantageously the ends of the fibre bundle are mounted in holders to maintain orientation of the fibres with respect to the mount and the camera sensor. This is to ensure that a reference point can be maintained as the bundle is removed and inserted into its mounts.

To analyse the image seen by the camera a frame store is preferably used to capture the image and transfer it to, for example, a computer for analysis. Preferably a computer is used to analyse the output positions with regard to the transmitted test images and correlate the output to input positions of the individual fibres to create the reference table by which an input image can be reconstructed from the output light signals.

Preferably the reference table is constructed as a Look-Up Table, peculiar to each fibre, which can be used to correlate the output signals with the input image and de-convolve the output signals to give the input image. Advantageously the Look-Up Table can be programmed into a programmable device such as a PROM or an EPROM. A PROM or EPROM specific to a particular fibre bundle can then be produced.

The receiving of the light output from the fibres requires the detection of each spot of light from a fibre. The simplest way to detect a spot of light in a frame is to set a background threshold and to take each pixel whose value is above the background level as being part of the spot.

Problems may be encountered in differentiating between one fibre being illuminated and several spread over the frame. To identify one fibre, its lighting level is used to differentiate it from its background. Advantageously, to detect the uniformity of the illumination the continuity of the luminous area is checked.

It is found that the intensity of light over the end surface area of the fibre shows very little variation as, in accordance with the theory of propagation of light along multimode fibres, the light travelling through the glass is spread almost uniformly in cross-section.

Preferably one point is used to indicate the output position of the fibre. This enables the storage space needed for the reference table to be minimised. Advantageously the centre of the illuminated area is used. The area that the fibre occupies can then be rebuilt from this one point.

The present invention further provides an apparatus for calibrating incoherent optical fibre bundles for use as pseudo-coherent optical fibre bundles for the transmission of visual images, which comprises:

an address array capable of defining for the optical bundle the position of individual pixels corresponding to the position of the ends of the individual optical fibres in the bundle;

a series of test images for transmission into one end of the optical fibre bundle each test image producing a different illumination pattern and each illuminating a substantial proportion of the pixels, the combination of the test images selectively illuminating each pixel of the address array;

means to analyse the output of the fibre bundle with reference to the transmitted images; and means to produce a reference table of input to output position for each fibre based on the information provided by the test images to enable an image transmitted along the fibre to be deconvolved.

Preferably the address array, test images and reference table etc. are as described above.

The invention further provides a pseudo-coherent fibre optic viewing system comprising:

at least one incoherent fibre optic bundle, having an input end for receiving an image and an output end;

a camera to detect signals from the output end of the fibre optic bundle;

a frame store to capture images from the camera;

a translator to de-convolve the image output from the fibre optic bundle and produce a reconstructed picture of the input image and including a device programmed with a reference table specific to the fibre optic bundle in use; and display means to display the reconstructed image.

Preferably the camera is a solid state charge coupled device (CCD) camera. Alternatively a video camera could be used.

Preferably the end of the fibre bundle is magnified so that the image received by the camera is as large as desirable. Ideally the image is magnified to the size of the CCD sensor in the camera to give maximum image resolution. Advantageously this can be done by reversing the normal lens mounting on the camera so that the camera sensor is now at the object end of the lens. Preferably a sliding tube arrangement is provided to enable the distance from the sensor to be varied and thus the magnification of the image of the fibre bundle end to be varied.

Advantageously a holder is provided to hold the output end of the fibre optic bundle in position in relation to the camera. Conveniently a holding device is provided at the viewing end of the fibre optic bundle to enable the correct orientation of the input image to be achieved with respect to the reconstructed image. Preferably the frame store and translator are in a hard wired unit. Preferably the translator uses one point to indicate the output position of the fibre. This enables the storage space needed for the reference table to be minimised. Advantageously the centre of the illuminated area is used. The area that the fibre occupies can then be rebuilt from this one point. Preferably the translator reconstructs the image using one of three alternative methods of image reconstruction:

i) If the number of pixels that the original area contained is also stored, and that area is assumed to be round, then a near exact copy of the fibre can be rebuilt by arranging the number of pixels in a circle;

ii) If just the centre points of each fibre are stored, a square area of suitable size can be filled around each centre, with the intensity of the centre point, to give a completely full image on reconstruction; and iii) The centre points and their intensity can be used to interpolate between adjacent centres to obtain the pixel value between centres and thus a smooth complete image can be reconstructed.

Method i) gives the best reconstructed image but requires the most computing power, method ii) is simple and convenient and uses the least computing power but gives a degraded image, method iii) is preferred as it gives the best combination of use of computing power and image quality.

The size of the area to be filled in around each centre is preferably calculated for each centre and stored with the reference table. Alternatively the area can be preset at some size and shape and automatically filled in. This requires less memory for the reference table but may not produce such a good picture quality. Conveniently the display means may be a television type monitor.

Advantageously the viewing system further includes a lens arrangement to focus an image onto the input end of the fibre bundle.

BRIEF DESCRIPTION OF THE DRAWINGS

The invention will now be described, by way of example only, with reference to the accompanying Drawings, of which:

FIGS. 1a and 1b show respectively the typical input to output spatial relationship of a coherent fibre bundle and incoherent fibre bundle;

FIG. 2 shows projector and lens system for transmitting test images to an optical fibre bundle;

FIG. 4 shows the output end of the optical fibre bundle with focussing lens and camera for recording output pattern;

FIG. 5 shows a plot of relative number of pixels versus pixel intensity; and

DETAILED DESCRIPTION OF PREFERRED EMBODIMENTS

FIG. 1a shows that a coherent optical fibre bundle (1) maintains the spatial relationship of input to output for individual fibres allowing transmission of image from one end to the other without corruption. As shown in FIG. 1b, however, an incoherent optical fibre bundle (2) does not maintain the spatial relationship of individual fibres at the input and output positions resulting in corrupted transmission of images.

Figure 3:
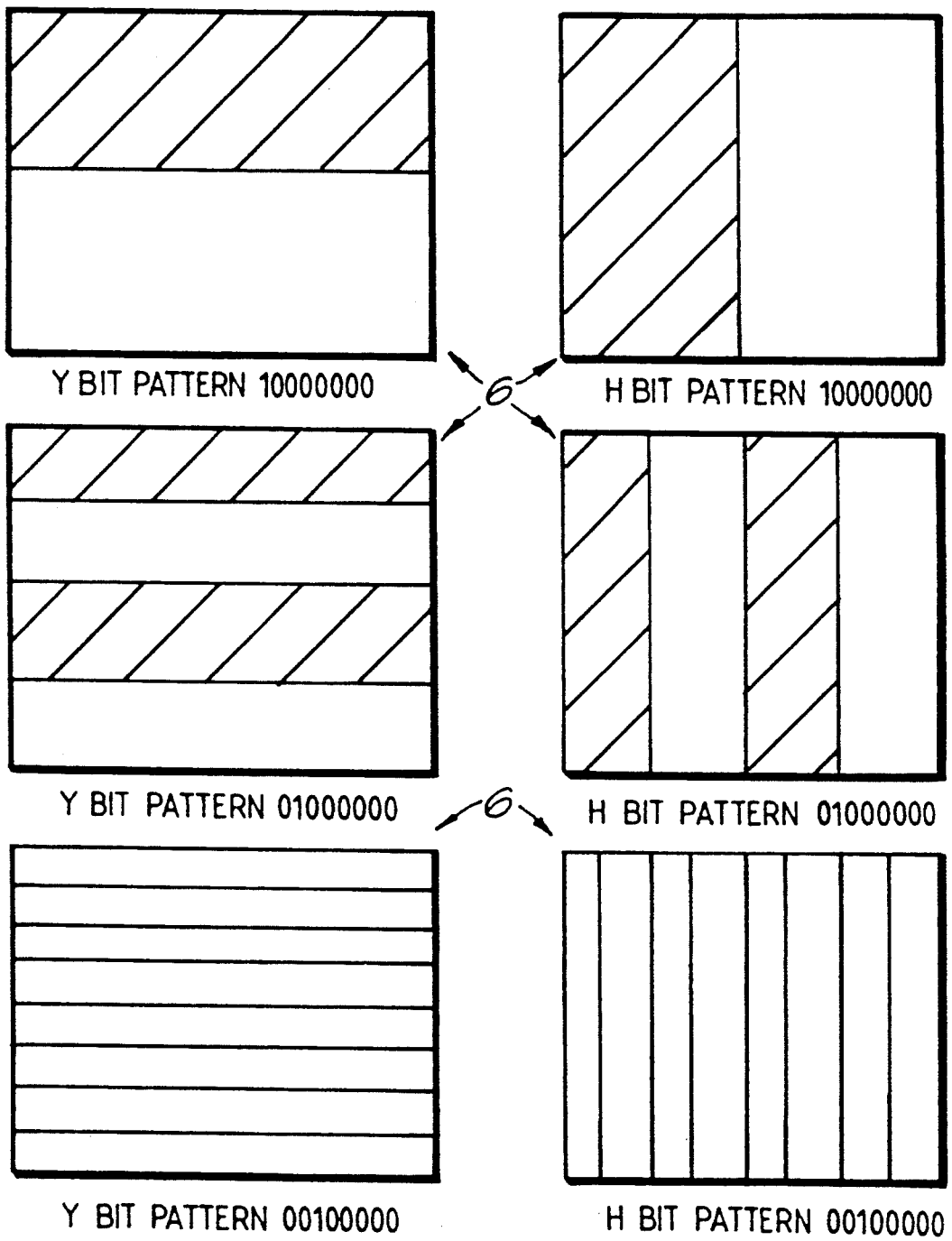
FIG. 3 shows test screens used to produce the test images referred to in FIG. 2.

Referring to FIGS. 2 and 3 a calibration system (3) for an incoherent optical fibre bundle (2) comprises a 5 inch monitor (4), mounted on an optical bench (5), the monitor (4) being used to project test screen images (6) to a lens system (7) also mounted on optical bench (5) the size of monitor (4) being small to allow lens system (7) to be simple in construction. The calibration system (3) is shielded from external light by an enclosure (8). The test images (6) correspond to setting areas of the monitor image to maximum brightness (white) and the rest to black. The monitor (4) and lens system (7) are kept in a rigid frame of reference by the optical bench (5) which also provides a common centre for the transmission of images along the optical fibre bundle (2) whilst preventing interference. As the output from the optical fibre bundle (2) will be corrupted it is necessary initially that the focussing of the test images (6) be undertaken with a coherent optical fibre bundle to make any corrections necessary to focussing and the incoherent optical fibre bundle (2) is then substituted. A white screen is transmitted to obtain the full fibre area as a reference measurement and the area calculated. Each of the test images (6) produced by monitor (4) illuminates half the fibres in the bundle (2). A test image (6) is then transmitted and the output area compared with the expected value of half the reference value, and appropriate corrections made to focussing.

The optical fibre bundle (2) is held rigidly in correspondence with lens system (7) to allow test images (6) transmitted from the monitor (4) through lens system (7) to travel along the optical fibre bundle. The bundle (2) has an input address grid which has a square configuration of 256×256 fibres giving a total of 65536 individual fibres which can be addressed by test images (6) with Y address patterns of 8 bits and X address patterns of 8 bits. The Y address produces a horizontal stripe pattern and the X address produces a vertical stripe pattern. A total of 16 test images (6) are produced and transmitted through the fibre bundle 8 X bit and 8 Y bit.

The areas set to white are determined by the address bits of each pixel in the array of 16 bits so that the bit pattern

| Bit No. | 16 15 14 13 12 11 10 9 | 8 7 6 5 4 3 2 1 |
|---|---|---|
|  | 1 0 0 0 0 0 0 0 | 0 0 0 0 0 0 0 0 |
| Address | Y | X | corresponding to line 128 sets the top half of the screen lines 0–127 to black and the lower half lines 128–255 to white. Detail down to alternating single lines of pixels is obtained using the bit pattern:

| Bit No. | 16 15 14 13 12 11 10 9 | 8 7 6 5 4 3 2 1 |
|---|---|---|
|  | 0 0 0 0 0 0 0 1 | 0 0 0 0 0 0 0 0 |

This produces a pattern where every other horizontal line is white.

These test images correspond to one bit in the 16 bit address being set to white and transmitted through the bundle of fibres so that collectively each bit No has been set to 1 once. All the pixels illuminated in the output image for each test image has the particular test bit of its corresponding input address set to 1 with the pixels not illuminated set to 0.

The 16 test images (6) thus described can be added or subtracted such that the resulting illumination at the input to the fibre bundle is equivalent to any predetermined pixel of the input array. Thus by recording the output pixel patterns for each test image (6) it is possible to relate each input pixel to one or more output pixels.

With reference to FIG. 4 the end of the fibre bundle (2) where the output of the test images (6) is received is clamped in position by fibre mount (9) to hold the fibres in position. The fibre mount (9) fits within holder sleeve (10) which is joined by lens (11) lens mount (12) and spacer (13) to a OCD camera (14) to receive the output. To gain the required magnification of the end of the fibre bundle (2) the camera lens is reversed so that the sensor in the camera is at the object end. The mount (9) slides within sleeve (10) and allows the distance of the fibre bundle (2) from the camera lens to be varied and therefore the magnification of the fibre bundle can be varied. The output of camera (14) provides a composite video image to a frame store (described below) which digitizes the video image. The frame store interfaces with a computer which analyses the images to determine the output position of an input light signal as determined through the test images (6). A computer then constructs a look-up table for the fibre bundle (2) correlating each output position to its respective input position.

The output from the fibre bundle (2) contains a spread of pixel values even for a uniformly illuminated input image. Because of this instead of a white and black image being received from the fibre bundle (2), a grey scale image is obtained and a threshold is chosen above which a pixel in the output image is considered to be white and the fact that each test image illuminates half the fibres is used in determining the threshold for each image. An integration of the number of pixels at each intensity versus the discrete intensities, as shown in FIG. 5 was performed on the output from each test image. The value of intensity above which half the fibre output area was illuminated was taken to be the correct threshold. This value varies with each test image since the monitor does not output a consistent amount of light for all the test image and the threshold value is calculated for each test image.

Figure 6:
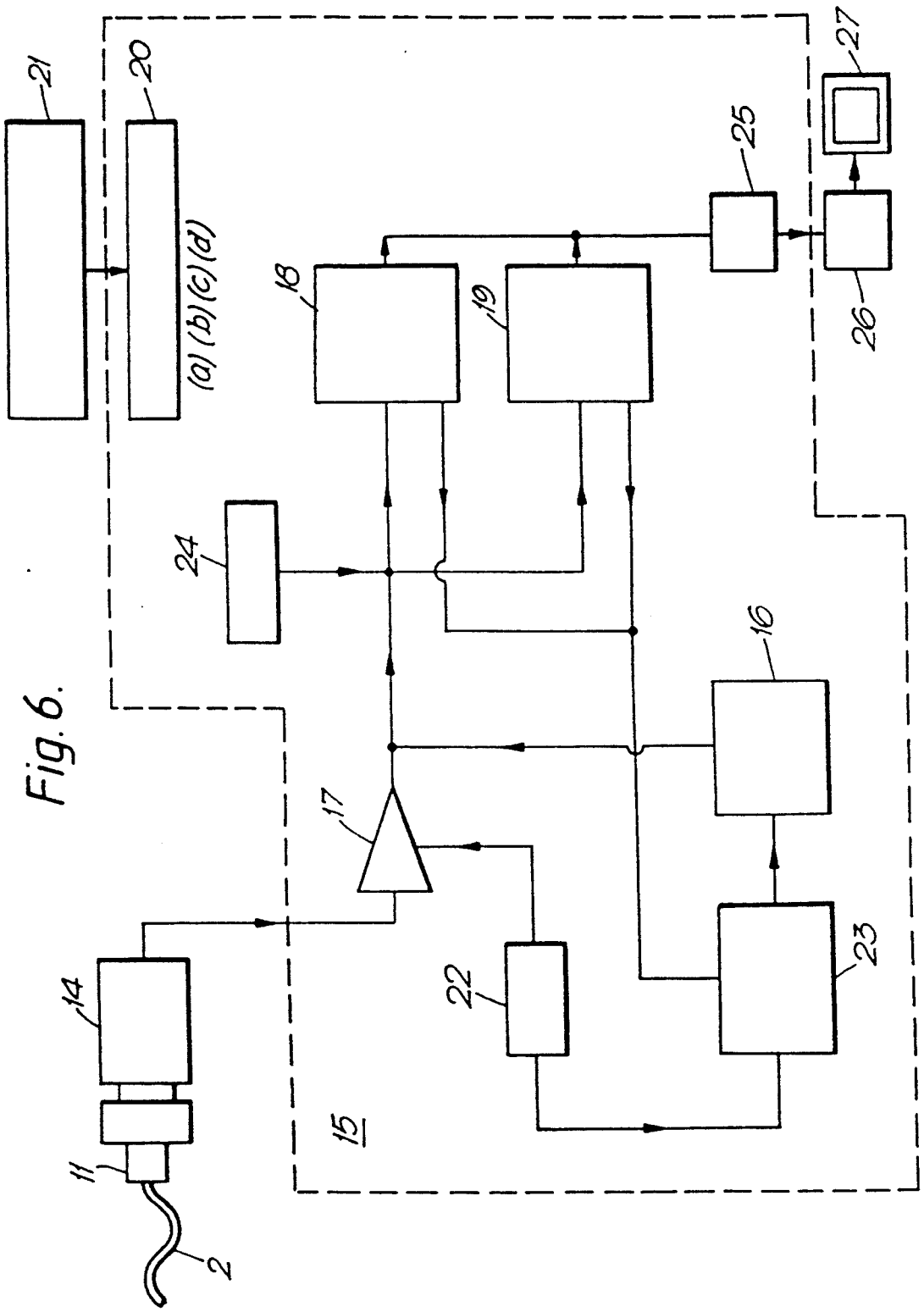
FIG. 6 shows a system block diagram of image decoding apparatus.

FIG. 6 shows a fibre optic viewing system according to the invention. A fibre bundle (2), which has been calibrated, is mounted on an image receiving unit which includes a lens arrangement to focus the image onto the end of the fibre optic bundle (2). The other end of the fibre optic bundle (2) leads into a camera (14) with a magnifying lens arrangement (11) for the calibration apparatus. The video image from the camera (14) is passed to a frame store/translator (15). The basic operation of the frame store/translator (15) is to rearrange the image from the camera (14) according to the calibration information for the fibre optic bundle (2) to provide an image corresponding to the image received by the fibre optic bundle (2). The calibration information for the fibre optic bundle (2) is provided in the form of a Look-Up Table (LUT) (16) contained in a replaceable EPROM so that the appropriate LUT (16) can be inserted into the frame store/translator for a particular fibre bundle (2). The data stored at each address in the LUT (16) is the new address required for the transformation of the image.

The video frame input from the camera (14) is digitized by an Analogue-to-Digital converter (17) for further processing by the frame store/translator (15). Two memory frame buffers (18), (19) are provided. The image from the A/D converter (17) is captured in one buffer (18) or (19) and the image is translated through the LUT (16) to the other buffer (18) or (19). A cpu interface (20) interfaces to a controlling computer (21) with the interface (20) being input/output mapped. The interface (20) has four registers which hold, (a) control switching functions controlling flow of data, (b) and (c) data to and data from the frame buffers (18), (19) and the LUT (16) and (d) the address to be written to for display.

The capture and display of a frame is controlled by the data in the control register (a). The control register (a) selects one of the frame memory buffers (18), (19) and the mode (Read or Write). Access to the LUT (16) switches the display and capture function off. Read or Write access to the frame buffers (18), (19) can take place at any time. To allow this random access, the operating frequency of the circuitry is set by a master clock (22) at 20 MHZ.

To synchronise the start of each line in the LUT (16) with a rising edge of a clock cycle from clock (22) a Look-Up Table addressor (23), of a delay line with an invertor and an OR gate, is used.

Display counters (24), necessary for addressing the memory area are implemented using integrated circuits. The image for display from the memory buffer (18) or (19) is converted by a Digital-to-Analogue converter (25) for capture, and recording if required, by a video receiver (26) and display on a monitor (27).

The display is also accessible by the controlling computer (21) via the interface (20) to allow general image processing operations to be performed to improve the picture quality of the output image. The frame store translator (15) also has some internal image processing capability from the interface (20).

To minimize the storage space needed for the LUT (16), one point is used to indicate the output position of the fibre. The point used is the centre of the illuminated area. The area that the fibre occupies is then rebuilt from this one point for display on the monitor to give a continuous image. The operation is software controlled by the controlling computer (21). The centre points and their intensities are taken to interpolate between adjacent centres to obtain the pixel values between centres and thus enable a smooth, complete image to be reconstructed. The area to be filled in around the centre is calculated for each point and stored in the LUT (16) during calculation.

Thus an image seen by the lens arrangement (7) is passed along the fibre optic bundle (2) to the camera (14), which can be at a distance from the lens. The image received by the camera (14) is processed by a frame store/translator to de-convolve the image and reconstruct the image to that received at the lens. The reconstructed image is then displayed on the monitor. The image can be reconstructed and displayed in real time or can be stored for later reconstruction and examination.

This type of remote viewing system has many advantages over any system which requires active components such as cameras to be used at the viewing end. There are many situations where these types of system are not possible or are undesirable or inconvenient such as viewing inside chambers of corrosive or hazardous material or underwater where electrical equipment may pose dangers.

We claim:

1. A method of calibrating incoherent optical fibre bundles, said bundles having an input end and an output end, for use as pseudo-coherent optical fibre bundles for the transmission of visual images, comprising the steps of:

defining an address array, each address in the array defining in said incoherent optical fibre bundle the position of individual pixels corresponding to the position of the ends of individual optical fibres in the bundle;

transmitting a series of test images into the incoherent optical fibre bundle, each test image illuminating a substantial proportion of the pixels and the combination of said series of test images selectively illuminating each pixel of the address array;

analysing the output of the incoherent optical fibre bundle with reference to the transmitted images and producing a reference table of input to output for the incoherent optical fibre bundle;

storing said reference table;

using said stored reference table to de-convolve an image produced at the output end of the incoherent optical fibre bundle.

2. A method of calibrating incoherent optical fibre bundles as claimed in claim 1 wherein said defining step includes an address array having dimensions defining the position of individual pixels corresponding to the position of each optical fibre in the incoherent optical fibre bundle.

3. A method of calibrating incoherent optical fibre bundles as claimed in claim 2 wherein said defining step includes the step of mapping each fibre position in said incoherent optical fibre bundle by a unique address.

4. A method of calibrating incoherent optical fibre bundles as claimed in claim 1 wherein said defining step includes the step of determining the dimensions of the address array by binary code.

5. A method of calibrating incoherent optical fibre bundles as claimed in claim 1 wherein in said transmitting step each of the test images illuminates half the fibres of the incoherent optical fibre bundle.

6. A method of calibrating incoherent optical fibre bundles as claimed in claim 1 wherein said address array in said defining step includes a total number of bits in an X and Y array making up the address array and said total number of bits corresponds to the number of test images needed to locate the position of each fibre in the incoherent optical fibre bundle when each of said test images illuminates half of the fibres.

7. A method of calibrating incoherent optical fibre bundle as claimed in claim 6 wherein said transmitting step includes each test image for either the X plane or the Y plane has all the bits except one set to 0 (not illuminated) and the other to 1 (illuminated).

8. A method of calibrating incoherent optical fibre bundles as claimed in claim 1 wherein said transmitting step includes the generation of the test image by screens displayed on a monitor of appropriate resolution.

9. A method of calibrating incoherent optical fibre bundles as claimed in claim 1 wherein said transmitting step includes said test images having setting areas which provide an image of maximum brightness (white) whilst the rest of the screen is set to black.

10. A method of calibrating incoherent optical fibre bundles as claimed in claim 9 wherein said transmitting step includes images in which the areas which are white or black are determined by the address bits in said array.

11. A method of calibrating incoherent optical fibre bundles as claimed in claim 1 wherein said test image comprises illumination of the optical fibres in the form of vertical or horizontal stripes.

12. A method of calibrating incoherent optical fibre bundles as claimed in claim 1 wherein said analysing step includes at least one of addition and subtraction processing of the received images such that the output image corresponds to illumination by a single input pixel.

13. A method of calibrating incoherent optical fibre bundles as claimed in claim 1 wherein said transmitting step includes the step of using a lens system to focus the light output of the test images onto the end of the incoherent optical fibre bundle.

14. A method of calibrating incoherent optical fibre bundles as claimed in claim 1 wherein said analysing step includes using a solid state charge coupled device (CCD) camera to detect the output of the fibre in the incoherent optical fibre bundle.

15. A method of calibrating incoherent optical fibre bundles as claimed in claim 14 wherein said step of using a CCD camera includes the step of magnifying the end of the incoherent optical fibre bundle so that the image received by the camera is as large as desirable.

16. A method of calibrating incoherent optical fibre bundles as claimed in claim 1 wherein the incoherent optical fibre bundle ends are mounted in holders.

17. A method of calibrating incoherent optical fibre bundles as claimed in claim 1 wherein said analysing step includes the step of using a frame store to capture the output image.

18. A method of calibrating incoherent optical fibre bundles as claimed in claim 1 wherein said analysing step includes the step of using a computer to analyse the output positions with regard to the transmitted test images and correlating the output positions to input positions of the individual fibres in the incoherent optical fibre bundle to create the reference table by which an input image can be reconstructed from the output light signals.

19. A method of calibrating incoherent optical fibre bundles as claimed in claim 18 wherein said analysing step includes the step constructing of the reference table as a Look-Up Table, peculiar to each fibre, which is used for correlating the output signals with the input image and for de-convolving the output signals to give the input image.

20. A method of calibrating incoherent optical fibre bundles as claimed in claim 19 wherein said constructing step includes the step of programming said Look-Up Table into a programmable device comprised of at least one of a PROM and an EPROM.

21. A pseudo-coherent fibre optic viewing system comprising:
an incoherent optical fibre bundle calibrated in accordance with the method of claim 1 and having an input end for receiving an image and an output end;
a camera to detect signals from the output end of the incoherent optical fibre bundle;
a frame store to capture images from the camera;
a translator to de-convolve the image output form the incoherent optical fibre bundle and produce a reconstructed picture of the input image and including a device programmed with a reference table specific to the incoherent optical fibre bundle in use; and
display means to display the reconstructed image.

22. An apparatus for calibrating an incoherent optical fibre bundle for use as pseudo-coherent optical fibre bundle for the transmission of visual images, said apparatus comprising:
an address array means for defining, for said incoherent optical fibre bundle, the position of individual pixels corresponding to the position of the ends of the individual optical fibres in the bundle;
means for transmitting a series of test images into one end of the incoherent optical fibre bundle, each test image producing a different illumination pattern and each test image illuminating a substantial proportion of the pixels, said series of test images selectively illuminating at least once each pixel of the address array;
means for analysing the output of the incoherent optical fibre bundle with reference to the transmitted images; and
means for generating a reference table of input to output position for each fibre of said incoherent optical fibre bundle based on the information provided by the test images; and
means, responsive to said reference table and output from said incoherent optical fibre bundle, for deconvolving an image transmitted along the incoherent optical fibre bundle.

23. An apparatus for calibrating an incoherent optical fibre bundle as claimed in claim 22, wherein said address array means has dimensions defining the position of individual pixels corresponding to the position of each optical fibre in the incoherent optical fibre bundle.

24. An apparatus for calibrating an incoherent optical fibre bundle as claimed in claim 23, wherein each fibre position in said incoherent optical fibre bundle is represented by a unique address in said address array means.

25. An apparatus for calibrating an incoherent optical fibre bundle as claimed in claim 22, wherein dimensions of the address array means are represented by a binary code.

26. An apparatus for calibrating an incoherent optical fibre bundle as claimed in claim 22, wherein each of the test images comprises a means for illuminating half the fibres of the incoherent optical fibre bundle.

27. An apparatus for calibrating an incoherent optical fibre bundle as claimed in claim 22, wherein said address array means includes an X and Y array and the total number of bits in said X and Y array corresponds to the number of test images needed to locate the position of each fibre in the incoherent optical fibre bundle when each of said test images illuminates half of the fibres.

28. An apparatus for calibrating an incoherent optical fibre bundle as claimed in claim 27, wherein each test image is for one of the X plane and the Y plane and has all the bits except one set to 0 (not illuminated) and the other to 1 (illuminated).

29. An apparatus for calibrating an incoherent optical fibre bundle as claimed in claim 22, wherein said means for transmitting includes the generation of the test image on a monitor of appropriate resolution.

30. An apparatus for calibrating an incoherent optical fibre bundle as claimed in claim 22, wherein said test images have setting areas which provide an image of maximum brightness (white) whilst the rest of the screen is set to black.

31. An apparatus for calibrating an incoherent optical fibre bundle as claimed in claim 30, wherein said means for transmitting, in response to the address bits in said array, transmits test images in which the areas which are white or black are determined by said address bits in said array.

32. An apparatus for calibrating an incoherent optical fibre bundle as claimed in claim 22, wherein said test image comprises one of vertical and horizontal stripes.

33. An apparatus for calibrating an incoherent optical fibre bundle as claimed in claim 22, wherein said means for analysing includes at least one of a means for addition processing and for subtraction processing of the received images such that the output image corresponds to illumination by a single input pixel.

34. An apparatus for calibrating an incoherent optical fibre bundle as claimed in claim 22, wherein said means for transmitting comprises a lens system for focussing a light output of the test images into the end of the incoherent optical fibre bundle.

35. An apparatus for calibrating an incoherent optical fibre bundle as claimed in claim 22, wherein said means for analysing comprises a solid state charge coupled device (CCD) camera for detecting the output of the fibres in the incoherent optical fibre bundle.

36. An apparatus for calibrating an incoherent optical fibre bundle as claimed in claim 35, wherein said means for analysing includes a means for magnifying the end of the incoherent optical fibre bundle before image reception by the CCD camera.

37. An apparatus for calibrating an incoherent optical fibre bundle as claimed in claim 22, further including holders for mounting the ends of the incoherent optical fibre bundle.

38. An apparatus for calibrating an incoherent optical fibre bundle as claimed in claim 22, wherein said means for analysing includes a frame store for capturing the output image from said incoherent optical fibre bundle.

39. An apparatus for calibrating an incoherent optical fibre bundle as claimed in claim 22, wherein said means for analysing and said means for generating a reference table comprises a computer for analysing output fibre positions with regard to the transmitted test images and for correlating the output positions to input positions of the individual fibres in the incoherent optical fibre bundle, and for creating said reference table by which an input image can be reconstructed from the output light signals.

40. An apparatus for calibrating an incoherent optical fibre bundle as claimed in claim 39, wherein said computer constructs said reference table as a Look-Up Table peculiar to each fibre, and comprises a means for correlating the output signals with the input image and for de-convolving the output signals to give the input image.

41. An apparatus for calibrating an incoherent optical fibre bundle as claimed in claim 40, wherein said Look-Up Table is programmed into a programmable device, said programmable device comprising at least one of a PROM and an EPROM.

* * * * *